(12) United States Patent
Kashyap

(10) Patent No.: US 6,880,013 B2
(45) Date of Patent: Apr. 12, 2005

(54) PERMANENT TCP CONNECTIONS ACROSS SYSTEM REBOOTS

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 09/753,267

(22) Filed: Dec. 29, 2000

(65) Prior Publication Data
US 2002/0087697 A1 Jul. 4, 2002

(51) Int. Cl.[7] ................................................. A06F 15/16
(52) U.S. Cl. .................... 709/227; 709/228; 709/245; 370/395
(58) Field of Search ................................. 709/227, 228, 709/245, 250; 370/395, 399; 455/574

(56) References Cited

U.S. PATENT DOCUMENTS 6,115,382 A * 9/2000 Abe ........................ 370/395.3
6,216,151 B1 * 4/2001 Antoun ....................... 709/203
6,480,727 B1 * 11/2002 Gerdisch ..................... 455/574
6,546,425 B1 * 4/2003 Hanson et al. ............... 709/227
6,591,101 B1 * 7/2003 Shimbori ................. 455/435.1
6,651,105 B1 * 11/2003 Bhagwat et al. ............. 709/239

* cited by examiner

Primary Examiner—John Follansbee
Assistant Examiner—Jinsong Hu
(74) Attorney, Agent, or Firm—Law Offices of Michael Dryja; Abdy Raissinia

(57) ABSTRACT

Network or mobile clients are enabled to keep their connections open across shutdowns and reboots of computer systems. Transactions are suspended while the client system is down, and resumed when it comes back up, allowing end-users to perform orderly shutdowns of their systems (especially useful to save battery power on mobile systems) without risk of losing transactions on open TCP connections.

18 Claims, 4 Drawing Sheets

6,880,013 B2

PERMANENT TCP CONNECTIONS ACROSS SYSTEM REBOOTS

BACKGROUND OF THE INVENTION

1. Technical Field

This invention relates to maintaining connections for both mobile and non-mobile nodes in computer networks.

2. Description of the Prior Art

Most mobile devices, such as laptop computers, are frequently shutdown for a variety of reasons. For instance, most are battery-powered, so they often shutdown to conserve battery power. Airlines require such devices to be turned off when taking off or landing regardless of the power source. However, each shutdown causes termination of all applications and a loss of network connectivity, which results in substantial inconvenience to the user.

A problem resulting from the shutdown of a mobile device during an application can be illustrated by an example in which a traveler using a laptop computer in an airport connects to a database server and enters a complex query, which would normally take a long time to execute. However, when the traveler boards the plane, the system must be shutdown prior to takeoff. Upon reaching his destination, the traveler restarts the computer, rebooting the system and restarting the application. Yet, without permanent TCP connections across a system boot, a new connection must be established and the query must be reissued before the reply can be received. Accordingly, prior to the present invention there has been a need for a method by which mobile IP can remain connected across reboots.

SUMMARY OF THE INVENTION

The invention provides a method, system and apparatus that enables clients to keep their connections open during reboots or shutdowns of networked or mobile computer systems. The invention allows an end-user to perform orderly system shutdowns of mobile systems (especially useful to save battery power on mobile systems), without risk of losing transactions on open TCP connections. The invention further suspends each ongoing transaction while the client system is down, and resumes it when the system comes back up without loss of connectivity.

The mobile device of the present invention relies upon 'mobile IP' (RFC 2002) for connectivity. Mobile IP provides a static, unchanging IP address to the remote communication endpoint. The constant address allows the higher layer, such as TCP, to work with the remote endpoint as it travels from one location to another without loss of data. The present invention provides the additional advantage of retaining connectivity, even though the device is shutdown.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Figure 1:
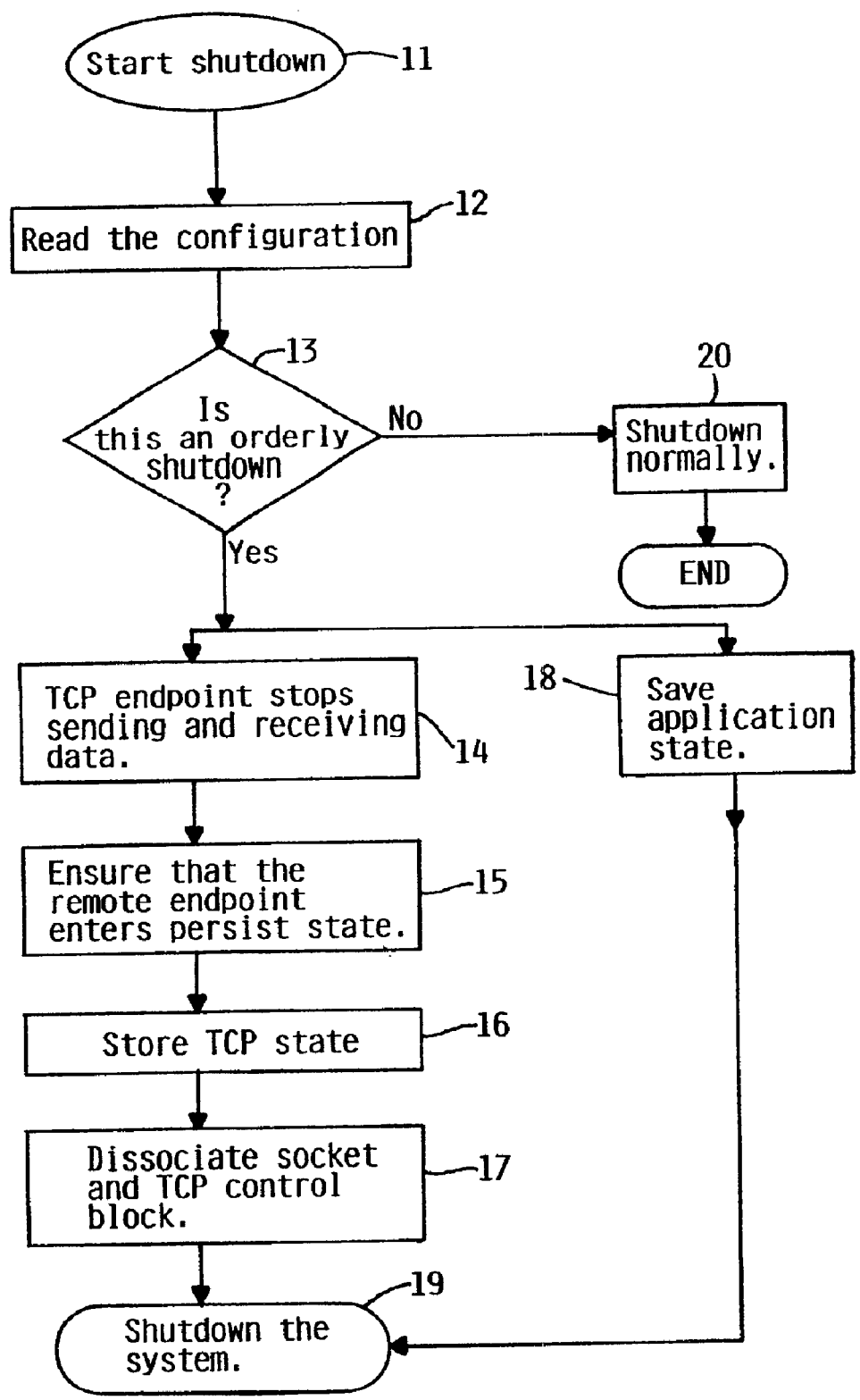
FIG. 1 is a flowchart showing the preferred embodiment of the invention.

In general, FIG. 1 depicts the process for shutting down the system according to the preferred embodiment without loss of connectivity.

Technical Background

Configuration

A system utility is used in the invention to mark the TCP endpoints that are maintained across reboots, step 12. The endpoints are described by the local port, local address, foreign port and foreign address. Alternatively, a method is provided by which endpoints that need to survive the shutdown/reboot cycle may be selected at the time of system shutdown.

Orderly Shutdown of the TCP Endpoint (Deactivation)

"Orderly" shutdown, is a deliberate action on the part of the user, as opposed to a system crash or failure, or a power cycle. In the invention, when the system shutdown command is given to the operating system, step 13, it alerts the TCP engine. The system waits for the TCP engine to save the TCP state, for the endpoints configured to survive the shutdown and reboot cycle. If the shutdown is a panic shutdown, the shutdown is handled normally. If the shutdown is orderly, the following steps are performed simultaneously.

The TCP endpoint stops sending or accepting data from the application, step 14. The TCP engine fails or blocks all read/write calls from the application. An implementation might fail the command with a suitable error code to let the application know that the connection is being 'deactivated.' Since the device is 'going down,' all interfaces are blocked from accepting new data.

The local endpoint acknowledges all data that is in the 'receive' buffer, and advertises a window of 0 (zero) in the acknowledgement. The remote endpoint then enters a TCP persist state.

In the preferred embodiment, the state of the TCP endpoint is stored on the disk or software agent, step 16. The state includes such information as the source and destination address, the port numbers, the window sizes, maximum size, data including any urgent data, and other information needed to maintain a TCP connection.

Received data that has been acknowledged, but not passed to the application, is stored with the TCP state. The data that was received from the application, but not sent across, or sent across but not acknowledged by the other end, is also stored with the TCP state.

A unique ID, along with the application name, is also stored with the TCP state. An implementation may store other information needed to identify the endpoint in accordance with the needs of the operating system and the environment in which the application is running.

Once the TCP state has been saved, the socket and TCP control block are dissociated from the file descriptor, step 17, to avoid the endpoint from being closed when the application exits and the file descriptor is closed. In the alternative, if the socket and TCP control block are not disassociated, the TCP engine sends a termination indication (FIN) to the other endpoint.

Orderly Shutdown of the Application

At the time the TCP state is saved, the application state is also saved, step 18, although the application on a mobile device is typically lightweight, i.e., without much state.

Alternatively, the application may be allowed to run to some defined 'sync' point, and then the state is saved. There is no need to repeatedly check the state.

System Reboot and Application Restart

Figure 4:
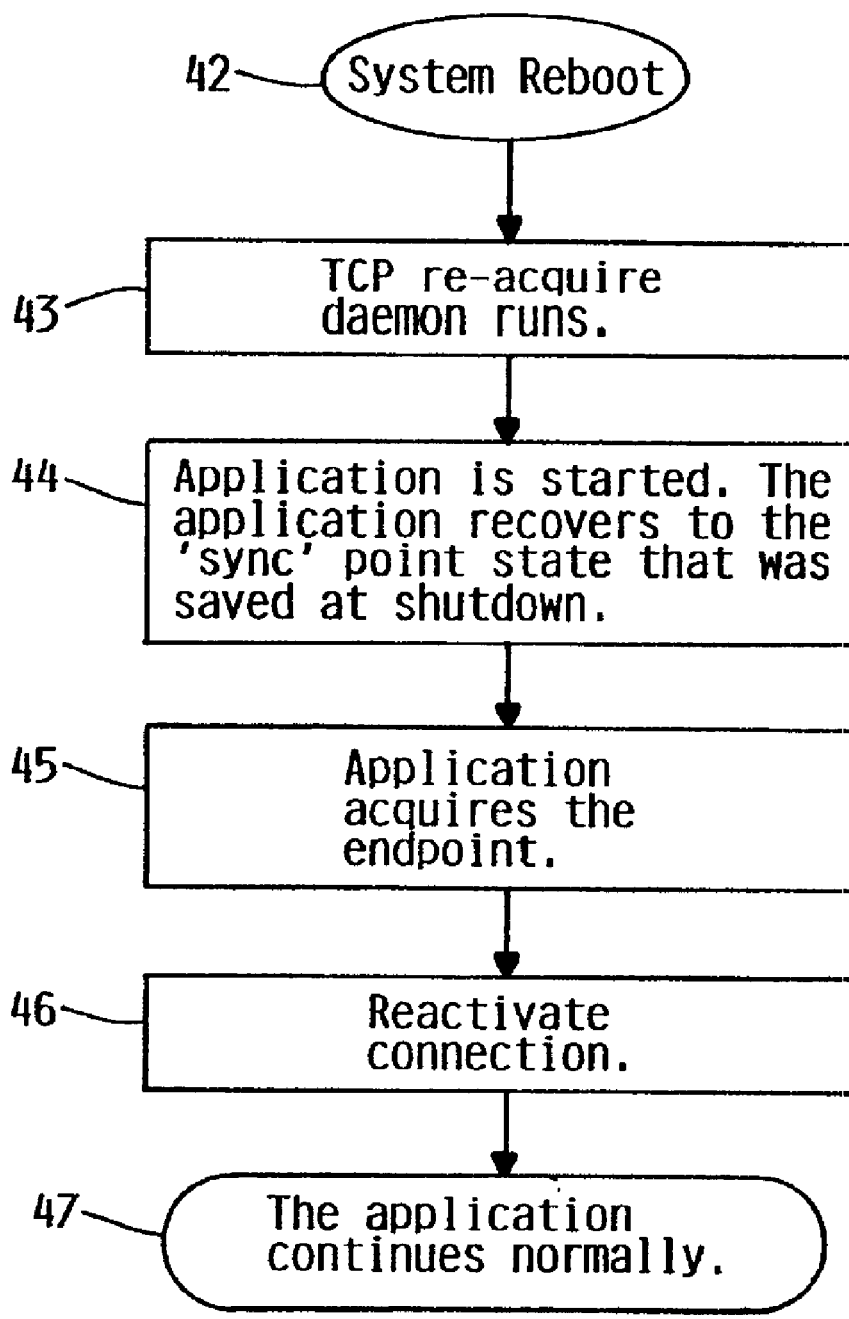
FIG. 4 is a flowchart showing a method for rebooting the system after normal shutdown.

FIG. 4 shows the process for rebooting the system according to the preferred embodiment. At the time the system reboots, a utility, referred to as the "TCP-reacquire daemon," is started to read in all of the saved TCP endpoint states, step 43. These endpoint states are added to the port/IP address table of the TCP engine using a system call. The endpoints are marked, so that data on the endpoints will not be accepted/sent until an application actually acquires the endpoint. It also sets up the data structures that are required to manage the connection(s) and initializes the structures with the saved data.

The application is then restarted, step 44. As noted above, the application is expected to either recover from the saved 'sync' point, or be stateless. The application asks for all of the endpoints that were previously connected to it, by application name or ID, step 45.

Alternatively, the application may request a connection to the remote endpoint by specifying the remote address and port.

Reactivating the Connection

Reactivation of the connection, step 46, is supported by modifications internal to the operating system kernel, as described below. The TCP engine endpoint is accessed by the application using the existing network APIs (Application Program Interface). For example, in the preferred embodiment, the BSD sockets API is used, although other network APIs may be modified in the same manner, as necessary.

In practice, to reactivate the connection, the application initially creates the communication endpoint, e.g., a socket( ) system call. For example, the socket API bind( ) call would discover if the requested binding already exists. If so, the binding would have been marked to indicate that it is a 'reacquire endpoint' by the 'TCP-reacquire daemon.' In the case in which connect( ) is called with an implicit bind( ), the lookup table is searched with the foreign address and port to discover any existing bindings that can be reacquired.

The socket is linked with the TCP binding and the data associated with the binding is linked with the socket when the connect( ) call is made. The TCP control block is then 'unmarked' to allow it to send/receive data. The remote endpoint is sent a byte window advertisement that is greater than zero (window is opened). This causes the remote peer to come out of persist state, and the two endpoints can then exchange data normally.

Causing the Remote Endpoint to Keep the Connection

In the absence of the solution presented in the invention, the remote endpoint can be in one of the following three states when the mobile node shuts down ("node" is a generic term referring to individual hardware components that make up a network, e.g., general-purpose computers, stand-alone terminals, portable computers, servers, switches, routers and the like).

i) The endpoint has transmitted all data it had and all data has been acknowledged. The remote endpoint will not transmit any data since it has none to send. It might send KEEPALIVE probes, if it has been so configured. If the remote endpoint receives some data from its application that needs to be sent to the mobile node, the remote endpoint will attempt transmission, which leads to situation (ii) described below.

ii) The endpoint has sent some data that has not been acknowledged. The remote endpoint will attempt to retransmit if it does not receive acknowledgement for this data. However, after certain number of attempts without acknowledgment, the remote endpoint will terminate the connection.

iii) The remote endpoint is in persist state, wherein the mobile node has closed the TCP stream window, in which case the remote host will periodically poll the mobile endpoint. If no response is received, the connection will be terminated.

Accordingly, all three situations cause the connection to terminate if the remote server does not receive a response. The remote endpoint sets an upper limit on the number of tries that will be made, after which, upon not receiving an answer, the connection will be terminated.

Figure 2:
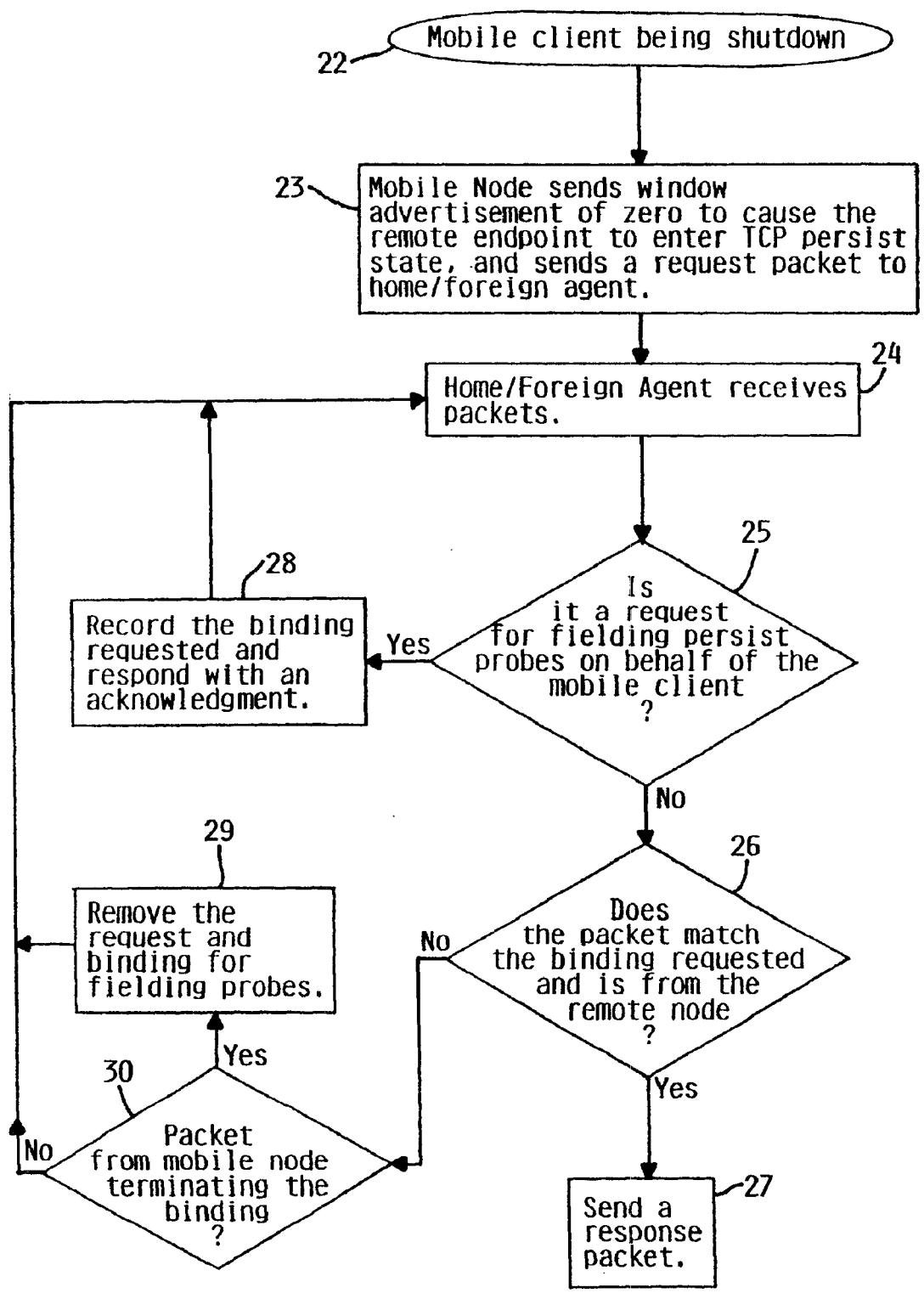
FIG. 2 is a flowchart showing placement of a remote endpoint in a persist state, as needed in the preferred embodiment of the present invention.
Figure 3:
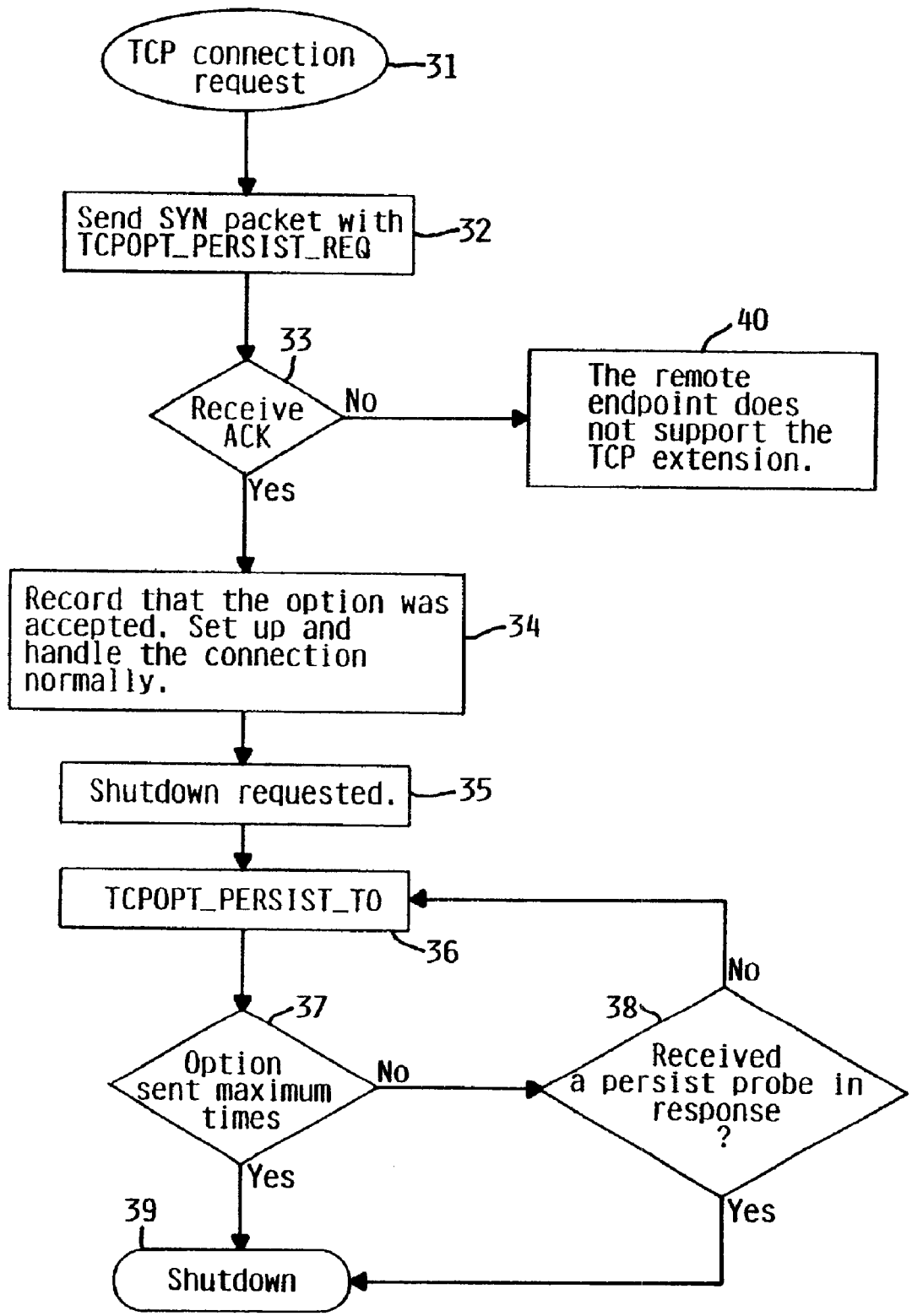
FIG. 3 is a flowchart showing an alternative method for putting the remote endpoint in a persist state.

Alternatively, as shown in FIGS. 2 and 3, the remote endpoint is made to keep the connection. In both cases, the alternatives cause the remote endpoint to enter a persist state.

Enhancement to Mobile IP (RFC 2002)

A home "agent" is contacted by the mobile node (whether in the home network or in foreign network), and informed of its intention of shutting down. The mobile node requests the home agent to handle this connection. It sends a zero byte window advertisement to the remote endpoint to place it into persist mode, step 23. The node then requests the agent to handle the persist probes from the remote endpoint. Upon receiving the window advertisement, the remote node will enter persist state and send persist probes, periodically and repetitively polling the connection, step 26.

Whenever the home agent receives a packet from the remote host, as in step 26, it responds with the window advertisement of 0 (zero bytes), step 27. The window advertisement is based on the information it had recorded when the mobile node had sent the request packet.

If the remote endpoint did not receive the packet, it might send a data packet. In response to any message from the remote endpoint, the agent is requested to respond with a window advertisement of 0, on behalf of the mobile node. The agent is given the exact packet that it needs to send along with the address/port of the remote endpoint and the address and port of the mobile node. The agent records this information and responds to the mobile node with an acknowledgment, step 28.

Alternately, the agent could be given the details of the response packet, instead of the exact response packet itself.

Once the mobile node gets confirmation that the home agent has received the request, the mobile node shuts down, steps 15 through 19 in FIG. 1.

When the mobile node rejoins the network, it asks the home agent to stop responding on its behalf, (a "recovery request") step 30, and resumes communication by opening a window. The agent then stops handling the remote peer's persist probes, and removes the binding that had been requested, step 29. The remote peer exits persist state when it receives a window advertisement greater than 0 (opening of the window).

Alternatively, the home agent may be configured with a timeout, such that if it does not receive a recovery request from the mobile node within the timeout, it can terminate the request for handling the remote peer's probes. It is preferable to contact the nearest agent to the mobile node, since it is likely to be on the same link or a short hop away. Thus, the invention can be further modified to pass the persist probe handling to the foreign agent.

Extension of TCP

As an alternative to the preferred embodiment of the invention, a client can request the remote peer to support a persistent TCP connection, based on two additional TCP options. This alternative requires neither an intermediate agent, nor repeated persist probes from the remote server. However, it does require modification of the TCP stack to support the options.

1) TCPOPT_PERSIST_REQ Option:

Referring to FIG. 3, the remote peer is requested to support the persist timeout that will be requested later. If the remote peer supports the option, the client will use the TCPOPT_PERSIST_TO option to inform it of the time for which the connection may be inactive. The remote end will keep the connection open, but will not probe it until the time period requested times out. TCPOPT_PERSIST$_{13}$ REQ option is sent with the SYN segment, step 32. It includes a cookie value that must change with every SYN segment, including retransmit.

If the remote endpoint is willing to accept TCPOPT_PERSIST_TO option later, the remote endpoint ACKs the SYN with TCPOPT_PERSIST_REQ, step 33, but without the cookie. The mobile node records the fact that the remote endpoint has accepted the persist request option, and the connection is setup normally, step 34. If the ACK does not have the option included, then the request has been denied.

2) TCPOPT_PERSIST_TO Option:

When sending the window advertisement of 0 at the time of shutdown, the client may add this TCP option, step 36. It includes the cookie that had originally been sent with the SYN segment for verification by the remote endpoint. This option specifies the timeout period in which the mobile host is expected to reconnect.

The remote node is required to acknowledge the receipt of this window advertisement with an immediate persist probe, step 38. This is regarded as an acknowledgment by the mobile node. Notably, a mobile node might retransmit the window advertisement multiple times (a retransmit is possible if the node does not get the persist probe), in which case the server is required to reply each time. When the mobile node receives the acknowledgment, it shuts down, step 39.

The server will not probe further until the timeout specified in the TCPOPT_PERSIST_TO option. If the server does not receive any response when the timeout expires, it will retransmit in the usual way, i.e., it will start the persist probes, just as it would have if it had received a window advertisement of zero bytes and there was no TCPOPT_PERSIST_TO option. The server will eventually terminate the connection if it does not receive any reply from the mobile node.

If the mobile node rejoins the network before the expiry of TCPOPT_PERSIST_TO timeout or before the remote server gives up persist probes, it will send a window open advertisement to the remote server, and the communication will continue normally.

The above two alternatives may be used in combination with the preferred embodiment, or in the alternative, one or both of the options can be selectively used by the administrator without any impact on the working of any other protocol or network.

Alternative Embodiments

In an additional alternative embodiment of the present invention, the invention could be implemented for non-mobile clients. Essentially, this is accomplished by handing off the handling of the remote endpoints persist probe to a device that is not going down.

In yet another alternative embodiment of the present invention, periodic saves of the TCP endpoint state could be made to protect against a possible crash of the system. The application must be capable of crash recovery. Then, the connection could be resumed on reboot.

In still another alternative embodiment, the invention can be used to migrate connections between server systems. This method is useful when a system has to be shutdown for maintenance or upgrades. The state can be saved on a medium accessible to the system that is going to take over, or it could be sent to the system over the network. The system being shutdown advertises a window of zero, causing the remote system to go into persist state. The system taking over the connection replaces the home agent in this solution, and it will, as required, also take over the IP address of the system being shutdown. The original system then shuts down, at which point the system taking over the connection restarts the application and reacquires the connection as described in the invention. The new system must adapt slightly to the prior handling of the persist requests. If TCP extensions are used, then the cookie needs to be passed to the server taking over service. However, in this case the server taking over the endpoint will not have to field persist probes.

Moreover, although the present invention is a method to keep TCP connections alive across reboots, the invention is not limited to TCP. An alternative embodiment for UDP could be conducted analogously as far as the application is concerned. UDP deactivation is much simpler, and there is no protocol state to be maintained.

For the orderly shutdown of the UDP endpoint (Deactivation), the UDP engine fails/blocks all calls from the application. All data in the socket buffers would be dropped, and the local endpoint state is transferred to the fail-over standby. The state information thus comprises the local IP address, local port, the foreign address and the foreign port. The socket and the UDP control block would be dissociated from the file descriptor. Then, the rest of the application recovery and start would be as described in the case of TCP applications.

Computer-readable signal bearing media include, but are not limited to, floppy disks, hard disks, tape and CD-ROMs.

It will be appreciated that, although preferred and alternative embodiments of the invention have been described herein for purposes of illustration, various modifications may be made without departing from the spirit and scope of the invention. Therefore, it is manifestly intended that this invention be limited only by the claims and the equivalents thereof.

What is claimed is:

1. A method for maintaining connection between a first endpoint node and a second endpoint node in a computer network comprising:

placing the connection between the first endpoint node and the second endpoint node in a persist state, the first endpoint node being one endpoint of the connection and the second endpoint node being another endpoint of the connection, wherein the second endpoint node is a node with which the first endpoint node ultimately desires to be connected;

placing the second endpoint node in an inactive state, such that the second endpoint node does not attempt to send any data to the first endpoint node while in the inactive state;

rebooting the first endpoint node, such that the connection between the first endpoint node and the second endpoint node is maintained due to the connection being in the persist state and the second endpoint node being in the inactive state; and reconnecting the first endpoint node and the second endpoint node.

2. The method of claim 1, further comprising, where the second endpoint node is no longer in the inactive state:

repetitively polling the first endpoint node by the second endpoint node; and responding by a third node acting as an agent on behalf of the first endpoint node to the polls.

3. The method of claim 1, further comprising:

requesting by the first endpoint node that the second endpoint node keep the connection open for a predetermined amount of time; and maintaining the connection for that predetermined amount of time.

4. The method of claim 1, further comprising activating a connection between the first endpoint node and a fourth node during rebooting of the first endpoint node.

5. The method of claim 1, wherein the network utilizes UDP protocol.

6. The method of claim 1, wherein the first endpoint node is a mobile node.

7. A system for maintaining connection between a first endpoint node and a second node endpoint in a computer network, comprising:

means for placing the connection between the first endpoint node and the second endpoint node in a persist state, the first endpoint node being one endpoint of the connection and the second endpoint node being another endpoint of the connection, wherein the second endpoint node is a node with which the first endpoint node ultimately desires to be connected;

means for placing the second node in an inactive state, such that the second endpoint node does not attempt to send any data to the first endpoint node while in the inactive state;

means for rebooting the first endpoint node, such that the connection between the first endpoint node and the second endpoint node is maintained due to the connection being in the persist state and the second endpoint node being in the inactive state; and means for reconnecting the first endpoint node and the second endpoint node.

8. The system of claim 7, further comprising:

means for reactivating the second endpoint node; and means for reactivating the connection between the second endpoint node and the first endpoint node.

9. The system of claim 7, further comprising a means for creating (activating) a connection between the first endpoint node and a fourth node during a shutdown of the first endpoint node.

10. The system of claim 7, wherein the network utilizes UDP protocol.

11. The system of claim 7, wherein the first endpoint node is a mobile node.

12. The system of claim 7, further comprising means for repetitively polling the first endpoint node by the second endpoint node where the second endpoint node is no longer in the inactive state.

13. An article for maintaining connection between a first endpoint node and a second endpoint node in a computer network system comprising:

a computer readable signal bearing medium;

means in the medium for placing the connection between the first node and the second node in a persist state, the first endpoint node being one endpoint of the connection and the second endpoint node being another endpoint node of the connection, wherein the second endpoint node is a node with which the first endpoint node ultimately desires to be connected;

means in the medium for placing the second node in an inactive state, such that the second endpoint node does not attempt to send any data to the first endpoint node while in the inactive state;

means in the medium for rebooting the first endpoint node, such that the connection between the first endpoint node and the second endpoint node is maintained due to the connection being in the persist state and the second endpoint node being in the inactive state; and means for reconnecting the first endpoint node and the second endpoint node.

14. The article of claim 13, further comprising:

means in the medium for reactivating the second endpoint node; and means in the medium for reactivating the connection between the second endpoint node and the first endpoint node.

15. The article of claim 13, further comprising means in the medium for activating a connection between the first endpoint node and a fourth node during a shutdown of the first endpoint node.

16. The article of claim 13, wherein the network utilizes UDP protocol.

17. The article of claim 13, wherein the first endpoint node is a mobile node.

18. The article of claim 13, wherein the medium is selected from the group consisting of: a recordable data storage medium; and a modulated carrier signal.

* * * * *